United States Patent [19]

Moritz

[11] 4,068,006
[45] Jan. 10, 1978

[54] SALT SEASONING MIXTURE

[75] Inventor: George Jordan Moritz, Clarks Summit, Pa.

[73] Assignee: Akzona Incorporated, Asheville, N.C.

[21] Appl. No.: 730,418

[22] Filed: Oct. 7, 1976

[51] Int. Cl.² .............................................. A23L 1/237
[52] U.S. Cl. ....................................... 426/99; 426/99;
426/648; 426/650; 426/649; 426/806
[58] Field of Search .................... 426/97, 806, 649, 99,
426/98, 591, 650, 648

[56] References Cited

U.S. PATENT DOCUMENTS

| Re. 27,981 | 4/1974 | Frank et al. | 426/806 |
|---|---|---|---|
| 2,851,359 | 9/1958 | Diller | 426/591 |
| 3,359,119 | 12/1967 | Milton | 426/591 |
| 3,505,082 | 4/1970 | Miller | 426/806 |

Primary Examiner—Jeanette M. Hunter
Attorney, Agent, or Firm—Francis W. Young; Tom R. Vestal

[57] ABSTRACT

A salt seasoning mixture comprised of sodium chloride, potassium chloride, and encapsulated citric acid. The encapsulation of the citric acid dissolves in a user's mouth within 1 to 10 seconds to mask the bitter aftertaste of potassium chloride in the mixture.

8 Claims, No Drawings

SALT SEASONING MIXTURE

BACKGROUND OF THE PRESENT INVENTION

Salt or sodium chloride is a necessary supplement to man both as a seasoning and as a dietary necessity. Man has long sought the compound for its nutritional value — even to the point of using it as payment for services and bartering.

It has been determined in recent years, however, that certain persons are affected by the concentration of the elements of salt, i.e., sodium, in the body. It has been reported that hypertension is aggravated in same people by levels of sodium in the body. It has also been reported that sodium chloride helps retain higher levels of body fluids.

Persons tending toward hypertension or high blood pressure are normally cautioned by medical authorities to control their sodium intake as a means, along with medication, to control the symptoms of the hypertension. People who tend to excess fluids in the body have found that reduction of sodium intake is helpful in controlling the body fluid level to a degree.

There have been numerous formulations prepared as an aid to reducing or eliminating to a large degree the sodium intake. Some formulations completely eliminate sodium chloride, but seek to retain the "salty" taste associated with the sodium chloride since the taste appears to be a primary need and desire built into man throughout his evolution. These formulations, while eliminating sodium chloride from the diet from the seasoning standpoint, have been largely unsuccessful in satisfying the principal hunger man appears to have for the saline taste of salt.

Other formulations, of which class the present invention belongs, dilute sodium chloride with other additives. These additives are tailored to improve the processability of salt as well as enhance the "salty" taste derived.

A common additive or diluent is potassium chloride because of its acceptance in the body functions. Potassium chloride has a rather unpleasant, even bitter, aftertaste, however, and it has been found that other additives are needed to mask the unpleasant taste. Monopotassium glutamate or glutamic acid, choline, fumaric acid, ascorbic acid and citric acid have been used with varying degrees of success as additives to mask the potassium chloride bitter taste.

Citric acid is an effective agent for masking the potassium chloride taste, but, as indicated in U.S. Letters Pat. 3,505,082, the deliquescence of citric acid causes difficulty in that formulations having citric acid tend to "cake" and become difficult to pour.

BRIEF SUMMARY OF THE INVENTION

The present invention is directed to a salt formulation having a potassium chloride mixed with sodium chloride and containing a citric acid as a bitterness suppressor for the potassium chloride taste. The action of the citric acid is augmented by delaying its effect on the taste buds of the mouth and tongue through the use of an encapsulating agent. The encapsulant also serves to prevent deliquescence of the citric acid and avoid caking of the mixture.

DETAILED DESCRIPTION OF THE INVENTION

The amount of sodium chloride in the mixture of the present invention is between 35 and 65% by weight, respectively. Preferably, the amount is between 50 and 55%. While studies have shown that the inherent bitter taste of potassium chloride is reduced in sodium chloride/potassium chloride mixtures of about, for example, 40% potassium chloride, the bitterness taste remains objectionable to a large portion of the consuming public, especially in a concentrated form. The bitterness taste appears to be delayed somewhat from the initial contact with the tongue — from about one to ten seconds.

Citric acid in amounts of ½ to 1½% have been found to be satisfactory in suppressing the bitterness taste of potassium chloride in the preferred mixtures by emitting what has been termed as a "fresh" taste to counteract the bitterness and permit the "salty" taste of sodium chloride to be primary in sensing of flavor.

Citric acid, unfortunately, acts as a deliquescent. Since sodium chloride/potassium chloride mixtures suitable for commercial sales must be resistant to a broad range of ambient conditions — including moisture — citric acid has heretofore been unacceptable for usage because it acts as a moisture conduit in the mixture. Moisture tends to cause the mixture to cake and crust and become unpourable through conventional methods.

It has also been found that the potassium chloride bitterness taste is more prolonged at times than the "fresh" taste imparted by citric acid — another question on the commercial viability of citric acid containing NaCl/KCl mixtures.

In encapsulating citric acid granules under the present invention, both the deliquescence and taste impartation of citric acid are controlled, and in accordance with the invention, mixtures of sodium/potassium chlorides containing citric acid are commercially viable "salt" products.

The encapsulant should restrain ambient moisture, i.e., humidity, from citric acid granules and release the citric acid in the mouth in 1 to 10 seconds and, of course, not be toxic to humans. One form of encapsulant is hydrogenated vegetable oil. Other forms are a cellulose-wax mixture and gelatin.

Additional additives to the mixture are free flowing and anticaking agents for the potassium and sodium chlorides, iodides for iodine supplements.

EXAMPLE I

A mixture of 55% sodium chloride and 44% potassium chloride and 1% citric acid was prepared by mixing the ingredients in a blending machine. Free flowing agents were added of 0.5% and 0.75% for KCl and N$_a$Cl, respectively. One hundred grams of the mixture were allowed to stand in a watch glass in ambient humidity conditions (40 – 50% humidity) for a period of one day. At the end of the day, the mixture was inspected and found to be encrusted and caked on the surface. The crust broke into large pieces when disturbed. The chunks were difficult to break.

EXAMPLE II

A mixture similar to Example I was prepared except that the citric acid was encapsulated with 15% by weight of hydrogenated vegetable oil. A sample mixture was placed in a watch glass in ambient humidity conditions (40 – 50%) for a period of 7 days. Some minor encrustation occurred, but the curst broke easily when disturbed.

EXAMPLE III

The mixture of Example II was tested to determine salty taste. Citric acid was found to be released by the encapsulation 1 – 3 seconds after placement in the mouth. One-eighth of one teaspoonful of the mixture was placed on 20 gram servings of iceberg lettuce and served code marked to taste testing group. Ratings of the mixture when compared with equal servings of lettuce sprinkled with sodium chloride were equal and the mixture was judged to have a "good salty taste".

Encapsulaton of the citric acid apparently causes the citric acid taste to last 2 – 3 minutes on the back of the tongue and is effective in masking the bitter potassium chloride taste. Unencapsulated, the citric acid dissolves on the tip of the tongue and lasts for 10 – 15 seconds.

What is claimed is:

1. A salt seasoning mixture consisting essentially of sodium chloride, potassium chloride, and citric acid granules, said citric acid granules being encapsulated with a non-toxic substance selected from the group consisting of gelation, cellulose-wax, and hydrogenated vegetable oil dissolvable in the mouth in from 1 to 10 seconds.

2. The salt seasoning mixture of claim 1 wherein citric acid granules are contained in the mixture from ½ to 1½% by weight.

3. The salt seasoning mixture of claim 1 wherein the sodium chloride granules are contained in the mixture from 35 to 65% by weight.

4. The salt seasoning mixture of claim 4 wherein the sodium chloride granules are contained in the mixture from 50 to 55% by weight.

5. A salt seasoning mixture comprising sodium chloride in the amount by weight of 35 to 65%, potassium chloride, and encapsulated citric acid in the amount by weight of ½ to 1½%, the citric acid encapsulate dissolvable orally in from 1 to 10 seconds.

6. The salt seasoning mixture of claim 5 wherein the citric acid is encapsulated with 15% by weight of hydrogenated vegetable oil.

7. The salt seasoning mixture of claim 6 wherein the citric acid is coated with an encapsulant selected from the group consisting of gelatin, cellulose-wax, and hydrogenated vegetable oil.

8. A seasoning mixture consisting essentially by weight of 55% sodium chloride, 44% potassium chloride, and 1% citric acid having an encapsulant selected from the group consisting of gelatin, cellulose-wax and hydrogenated vegetable oil.

* * * * *